Patented Nov. 24, 1942

2,302,833

UNITED STATES PATENT OFFICE 2,302,833

PREPARATION OF POROUS ARTICLES

Abraham Sidney Behrman, Chicago, Ill., assignor to A. S. Behrman, trustee of Porous Rubber Products Trust, Chicago, Ill.

No Drawing. Application May 26, 1939, Serial No. 275,844

6 Claims. (Cl. 260—723)

The present invention relates to the production of an improved type of porous material and has particular reference to the provision of articles such as battery separators in which an inherently porous material is combined with and produced in situ in a liquid binding medium which subsequently is converted into solid coherent form.

In the production of battery separators a type of material which has met with definite favor includes the combination with a rigid coherent binder, of silica gel particles having an inherent porosity which extends through the separator. In my reissue patent, No. 18,214, a battery separator of this type is described. In my copending application Serial No. 136,353, filed April 12, 1937, is described a method of forming battery separators having silica gel particles dispersed therein by utilizing a silica hydrogel which is converted into the form of dried particles after dispersion. A difficulty with the process described in my patent and in my copending application is to be found in the mixing process by which the binder and silica gel are combined to form a product of continuous porosity.

A principal object of the present invention is the provision of an improved process by which better dispersion of smaller particles of gel is obtained in the binder.

A further object of the invention is the formation of a hydrogel in situ in a liquid binder which subsequently is set into a coherent form, the liquid binder medium preferably being composed of rubber latex which may be coagulated and vulcanized subsequent to the production in situ of the hydrogel.

Still another object of the invention is the production of a porous material by mixing together in an aqueous rubber latex suspension, silica gelforming reactants which are dispersed in the rubber latex in solution form before the completion of the gel-forming reaction, the latex subsequently being converted into coherent solid form.

In the production of battery separators it has been suggested to employ a porous rubber having continuous openings. A form of this type of battery separator is described in Patent No. 1,745,657. Such separators are not altogether satisfactory since the porosity of the separator depends entirely upon voids in the material. These voids are of appreciable size and have a tendency to allow migration of the material of the battery plates. The voids tend to become plugged with sediment or solid particles and thereby decrease the porosity of the plate as well as its efficiency.

In producing my improved porous material there is provided a porosity in the binder material which is due in large part to particles of silica gel or some other gel. Dried gel particles have the property of imparting continuous porosity to the material with which it is combined and this porosity is more uniform in the case of smaller particles than with larger particles.

At the same time the gel particles inhibit the passage of undesirable substances through the porous material and since the porosity of the combined material is due at least largely to the inherent porosity of the gel particles, clogging of the material is prevented.

In accordance with a preferred embodiment of the present invention, there initially is provided an aqueous suspension of a binding material which subsequently can be converted into nonliquid form. Rubber latex constitutes the most suitable binder of which I now am aware. A desirable form of the latex consists of a concentrated suspension containing about 65 per cent by weight of rubber. At this concentration the latex is in liquid form and may be poured.

The next step in the process includes forming in the body of the liquid binder a gel which subsequently may be converted into particle form by drying. Silica gel has proven to be highly satisfactory as a porous gel to be mixed with a binder in the production of separators for lead storage batteries.

In the production of a gel chemical reactants are mixed together in solution form and the completion of the gel-forming reaction is indicated by the setting of the gel into somewhat definite form in admixture with a relatively large quantity of water. This reaction is carried out in the rubber latex medium so that when the gel reaction is complete and the mass sets up into a cohesive body there apparently is obtained a molecular dispersion of the gel in the rubber. Whether or not the dispersion actually is molecular there is obtained a maximum dispersion between the rubber and gel. As the gel is in colloidal form when produced it will be seen that the binder will have the gel in an extremely fine state of division.

In the porduction of silica gel in situ within the body of rubber latex, several specific reactions are available. One suitable method consists of the partial or complete neutralization of the alkali of a solution of an alkali metal silicate, such as sodium silicate, by pouring solutions of the sodium silicate and a neutralizing agent into the rubber latex and vigorously agitating the resulting mixture to produce a thorough commingling of the substances, this mixing action being completed before completion of the gelforming reaction.

A preferable method of producing the silica gel within the body of the rubber latex includes first neutralizing the alkali of a solution of sodium silicate with an excess of acid, and then neutralizing the excess of acid with ammonium hydroxide. A sufficient quantity of ammonium hydroxide may be employed to provide a definitely alkaline reaction mixture which will not cause coagulation of the latex. The sodium silicate solution employed in this type of process may be prepared by diluting 395 grams of 42° Baumé sodium silicate solution to one liter, the solution being of the type containing approximately 30 per cent silica and 9.5 per cent sodium oxide. The ammonium hydroxide solution may be 0.45 normal and the sulfuric acid solution may be 6.45 normal.

As an example of small scale production, the material may be produced by adding 100 cc. of the sodium silicate solution slowly and with constant stirring to 21 cc. of the acid. The result of this addition is a colloidal solution of silicic acid which will remain liquid for extended periods. In a separate vessel 71 cc. of the ammonium hydroxide solution are mixed with 90 grams of concentrated rubber latex containing about 65 per cent by weight of rubber and with 26.5 grams of flowers of sulfur. After the contents of each vessel are stirred thoroughly and separately, they are each poured quickly into a third container and stirred rapidly. In a matter of a few seconds the entire reaction mixture sets to a stiff, firm gel. The 10 or 15 seconds available for stirring the reaction mixture before the formation of the stiff gel enables a thorough admixture to be made between the gel-forming chemicals and the rubber latex before the gel-forming reaction is completed. It will be seen that in this manner a maximum dispersion of the gel in the rubber latex is obtained.

The gel mixture produced in the manner described has a consistency much like that of heavy cottage cheese and can readily be spread or worked into any desired shape or size by suitable molding or forming devices. The mixture can be extruded or otherwise formed in the shape of battery separators of predetermined shape. By operating rapidly the reaction mixture can be thoroughly stirred and poured while still fluid into a mold so that when the gel sets it will have the desired shape and size. Ribs or any desired type of irregular construction can be produced in this manner.

After the articles are formed as described into the desired shape they may be subjected to various types of treatment. One method of further treating the article consists in drying it directly and then subjecting the rubber to vulcanization. Fibrous material or the like may be added to the reaction mixture to hold the mass together during the drying operation.

Ordinarily it will be found preferable first to coagulate the latex by immersing the formed articles in a solution of an acid such as acetic acid or hydrochloric acid. Other methods of coagulation may also be employed. In a coagulated condition, the articles are quite coherent and strong and may be handled without danger of rupture or breakage. For instance, the articles may be lifted from a belt or other type of base or conveyor upon which they have been formed. The process lends itself particularly well to continuous operation since the coagulation of the rubber is practically instantaneous upon contact with the acid solution.

After coagulation the articles may be treated variously. Where it is desired to obtain a final product with a relatively low degree of permeability and porosity, the coagulated articles are dried before vulcanization to the extent necessary to produce a predetermined shrinkage and reduction of porosity and permeability.

By drying the formed articles bone dry before coagulation, voids in the rubber are practically eliminated and the material then depends for porosity upon the inherent porosity of the gel particles. After drying, the material may be calendered or otherwise worked. Hydraulic pressing has proved to be a good method of reducing the water content of the material.

If maximum porosity and permeability are desired, the article may be vulcanized in steam or under water without initially drying it. When subjected to the latter method of vulcanization without drying, the vulcanized article may have practically the same size as the article initially formed. After vulcanization the article may be dried and it will be found that the shrinkage is practically negligible. In one satisfactory method of vulcanization a cure is effected by subjecting the composition to 60-pound steam pressure for 7 hours.

The porous articles produced as described will have a content of about 1 part of anhydrous silica to 5 parts of dry rubber. Where the porous material has been made by a reaction mixture of this type with coagulation, vulcanization under water, and final drying, it will be found to have good mechanical strength and flexibility, as well as a very high degree of porosity. This porosity may be evidenced by a water adsorption capacity equivalent to about 190 per cent of the dry weight of the separator.

The flexibility and other characteristics of the article will depend to a large extent upon well known chemistry of rubber manufacture, including such factors as the quantity of sulfur employed with the rubber latex. Obviously, the ratio of rubber to silica may be varied considerably, depending upon the mechanical strength, flexibility, coherence, permeability, and other features desired in the final product. In some cases the degree of permeability and porosity obtained by vulcanization of the article prior to drying or partial drying may be too great, and in such cases an accurate control can be effected by subjecting the article to partial drying before vulcanization.

A feature of the process is the great economy effected in the utilization of latex by reason of the relatively great volume occupied by the reaction mixture. It will be noted that the volume of the reaction mixture in the example referred to herein is more than 3 times the volume of the latex employed. Where no shrinkage of the product is produced by drying before vulcanization, it will be seen that this results in the production of about 3 times as many battery separators as would result from direct coagulation and vulcanization of the latex itself. Rubber latex normally commands a considerably higher price than plantation rubber. However, due to the large volume occupied by the reaction mixture, it is possible to produce battery separators in accordance with the present invention from rubber latex at a lower price than with plantation rubber. In addition to the factor of lower price the improved type of separator is of particular utility due to the complete dispersion of the silica gel in the rubber prior to vulcanization.

When the porous articles are produced by forming the gel in situ within the body of a liquid binder such as rubber latex and the liquid binder is changed into a coherent non-liquid body before drying of the silica gel and when the autoclave method of vulcanizing the rubber is employed, the gel structure is affected in such a manner that upon ultimately drying there occurs a minimum of gel shrinkage. Thus, the porosity of the article depends to a large extent upon the permeability of the gel particles. The relatively small proportion of voids effectively inhibits the migration of undesirable substances such as the active material of a battery plate and likewise prevents the clogging of the porous article by the accumulation within the voids thereof of foreign substances. The structure produced as described also has the definite advantage of being less compressible than porous rubber structures lacking the dispersed particles of silica gel.

An additional advantage of my improved process lies in the feature of the use of relatively cheap flowers of sulfur as compared with the expensive aqueous colloidal suspension of sulfur commonly used in preparing articles from latex. This is made possible by the incorporating effect of the gel. That is, the flowers of sulfur may be maintained in suspension in the rubber latex during the gel-forming reaction due to the constant stirring to which the reaction mixture is subjected. Then, when the gel sets it mechanically holds the sulfur particles in suspension and in uniform distribution within the rubber medium.

If desired, the step of washing the porous article to remove salt produced in the gel-forming reaction may be carried out at almost any stage of the process after the latex has been coagulated. The coagulation prevents the latex from being washed out with the water. Ordinarily where the porous article is vulcanized under water a sufficient leaching out of the salts will be effected at this point to render the article suitable for most uses.

The method of coagulating the latex may be treatment with mineral acid or with an organic acid such as acetic acid. The coagulation also may be secured by drying to the proper point, or the reaction mixture may be carefully controlled in its composition so that its composition is not sufficiently alkaline to prevent immediate or eventual coagulation. Heating to drive off ammonia from the reaction mixture also will provide coagulating conditions. Solid particles of relatively slowly acting acidic materials such as aluminum sulfate and potassium acid sulfate may be incorporated in the reaction mixture to produce delayed coagulation.

The amount of sulfur employed in the example given herein is sufficient to form a hard rubber or ebonite. If a softer material is desired the proportion of sulfur can be correspondingly reduced. The type of reaction characteristic of the present invention affords the possibility of adding other insoluble materials than sulfur to the composition for any specific effect. Soluble substances likewise may be introduced into the reaction mixture to obtain complete dispersion in the rubber.

It will be seen that before the liquid binding medium is converted into solid coherent form there is produced within the liquid binder a gel which in subsequently dried form has an inherent permeability. A substantial increase in the volume of the binder is obtained by incorporating therein the gel structure. After incorporation of the gel the binder then is converted into solid coherent form to permanently entrap the gel structure in a state of maximum distribution. In fact, it is possible that upon subsequent drying of the porous material the particles of gel approach molecular size.

It is possible in some instances to employ other binders than rubber latex. For instance, other binding materials include emulsified asphalt, synthetic resins which may set upon the application of thermal or other treatment, and a rather wide variety of similar materials. The particular gel employed will depend upon the use to which the porous article is to be put. In the case of lead storage batteries, silica gel and rubber latex are preferred by reason of the inertness of the two materials to sulfuric acid and to the oxidizing conditions existing at the positive plate of the battery. For other purposes such as in the production of filter plates and insulation material, a different choice of constituents may be more satisfactory. Other gels which may be used in accordance with the process include alumina gel and iron oxide gel. This general class of materials has the common characteristic of providing an inherently porous particle upon drying.

These various embodiments of the invention are intended to be included in the appended claims.

I claim:

1. A process of producing porous materials which comprises forming a colloidal solution of silicic acid by mixing a solution of an alkali metal silicate with an acid in such proportions as to leave an excess of acid in the solution, mixing said colloidal solution with rubber latex to which previously has been added sulfur in an amount sufficient for producing the desired rubber compound and ammonium hydroxide in an amount sufficient to neutralize the excess acidity of the colloidal solution and to prevent coagulation of the latex, said admixture resulting in the formation of a stiff gel embracing the whole reaction mixture and said gel being characterized by uniformity of dispersion of the silica hydrogel in the rubber latex, coagulating the latex and then vulcanizing.

2. A process according to claim 1 in which the composite gel material is shaped into desired form before the latex is coagulated.

3. A process according to claim 1 in which the composite gel material is shaped into desired form before the latex is coagulated and in which the shaped material is dried after vulcanizing.

4. A process of producing a battery plate separator which comprises forming a colloidal solution of silicic acid by mixing a solution of an alkali silicate with an acid in such proportions as to leave an excess of acid in the solution, mixing said colloidal solution with rubber latex to which previously has been added sulfur in an amount sufficient for producing the desired rubber compound and ammonium hydroxide sufficient to neutralize the excess acidity of the colloidal solution and to prevent coagulation of the latex, said admixture resulting in the formation of a stiff gel embracing the whole reaction mixture, proportioning the colloidal silicic acid and the latex so as to provide a relatively high degree of electrical conductivity in the end product, shaping the composite gel material into desired form and then, in sequence, coagulating the latex and vulcanizing.

5. A process according to claim 4 in which the proportion of sulfur to rubber is such as to produce a good grade of hard rubber.

6. A process according to claim 4 in which the shaped material is dried after vulcanizing.

ABRAHAM SIDNEY BEHRMAN.